(12) United States Patent
Cheng et al.

(10) Patent No.: US 7,021,646 B1
(45) Date of Patent: Apr. 4, 2006

(54) ADJUSTABLE RECEIVER HITCH

(76) Inventors: John C. Cheng, 768 S. Turnbull Canyon Rd., City of Industry, CA (US) 91745; Zhenqiu Huang, 768 S. Turnbull Canyon Rd., City of Industry, CA (US) 91745

( * ) Notice: Subject to any disclaimer, the term of this patent is extended or adjusted under 35 U.S.C. 154(b) by 0 days.

(21) Appl. No.: 10/980,756

(22) Filed: Oct. 27, 2004

(51) Int. Cl.
*B60D 1/01* (2006.01)
(52) U.S. Cl. .................. 280/495; 493/497; 493/507; 493/504
(58) Field of Classification Search ............... 280/495, 280/493, 497, 507, 504
See application file for complete search history.

(56) References Cited

U.S. PATENT DOCUMENTS

| 2,408,531 | A | * | 10/1946 | Riemann et al. | 280/491.3 |
| 3,768,837 | A | * | 10/1973 | Reese | 280/495 |
| 5,149,122 | A | * | 9/1992 | Helber | 280/491.2 |
| 5,507,515 | A | * | 4/1996 | Schellenberg et al. | 280/491.5 |
| 5,511,813 | A | * | 4/1996 | Kravitz | 280/495 |
| 5,620,198 | A | * | 4/1997 | Borchers | 280/507 |
| 2004/0061310 | A1 | * | 4/2004 | McCoy et al. | 280/495 |

* cited by examiner

*Primary Examiner*—Lesley D. Morris
*Assistant Examiner*—Marlon Arce-Diaz
(74) *Attorney, Agent, or Firm*—Albert O. Cota

(57) ABSTRACT

An adjustable receiver hitch (20) for receiving a hitch ball mounted, trailer ball mount that is attached onto the frame of a motor vehicle for pulling a trailer. A pair of frame mounting brackets (22) are configured for attachment onto the frame of the motor vehicle, with each mounting bracket further having flanges (24), lightening holes (28), and a plurality of bracket thru-holes (26). A pair of hitch mounting arms (30) are connected to the frame mounting brackets and interface with a selected set of the holes (28) for height adjustment of the receiver hitch relative to the motor vehicle frame. A box hitch (44) is adjustably attached onto each mounting arm by inserting the arms into a tubular sleeve (50) or (52) which is a connecting element of the box hitch. A receiver box (48) is connected on the lower surface of the tubular sleeve for receiving the hitch ball mounted on the trailer ball mount.

16 Claims, 8 Drawing Sheets

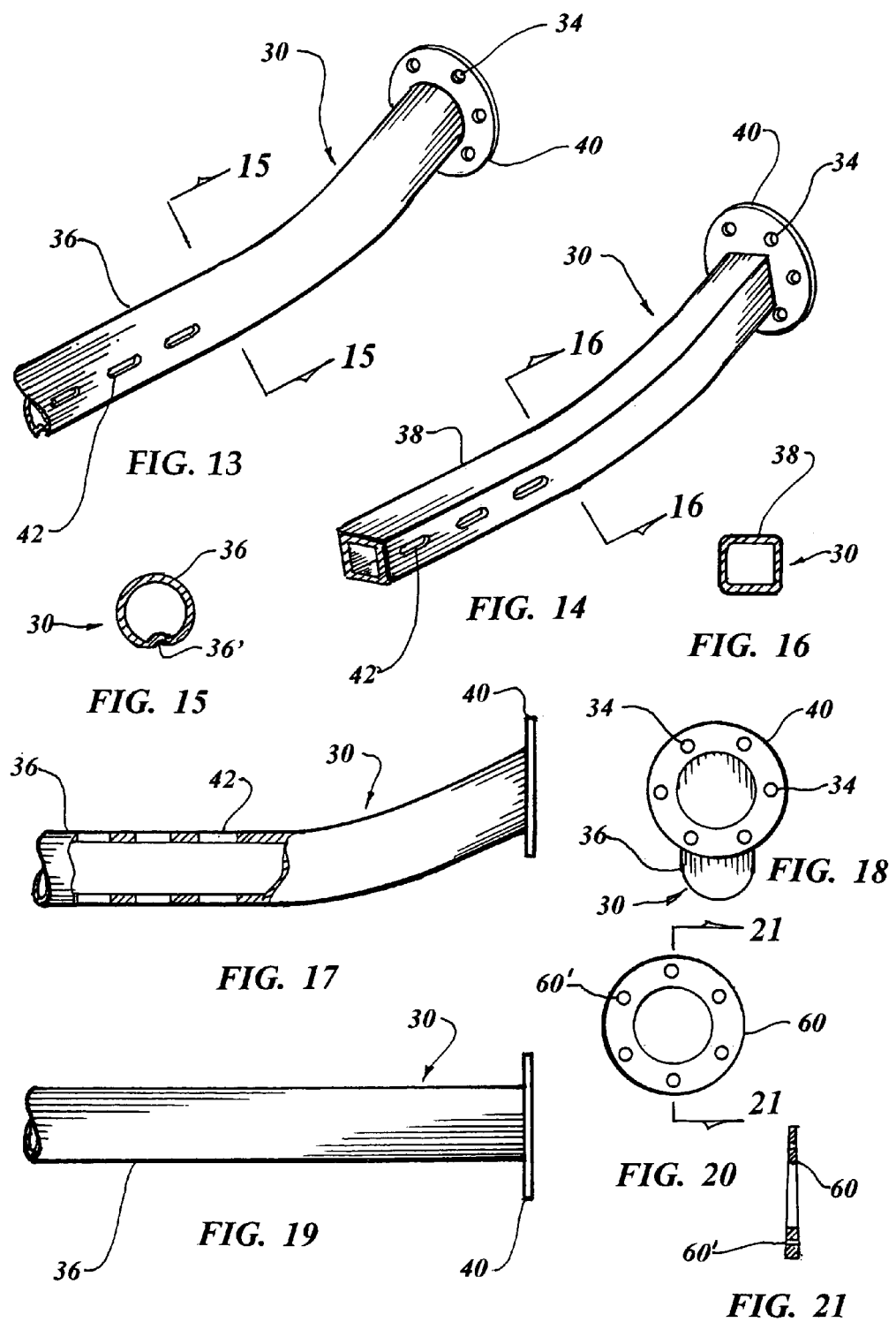

ADJUSTABLE RECEIVER HITCH

TECHNICAL FIELD

The invention generally pertains to receiver hitches, and more specifically to a trailer towing receiver hitch that is adjustable in width and height.

BACKGROUND ART

Previously, many types of receiver hitches have been used to provide an effective means for attaching a trailer using a ball mount and hitch ball onto a conventional pick-up truck.

The prior art listed below does not disclose any patents that possess the novelty of the instant invention, however the following U.S. patents are considered related:

| U.S. Pat. No. | Inventor      | Issue Date     |
|---------------|---------------|----------------|
| 5,149,122     | Helber        | Sep. 22, 1992  |
| 6,620,198     | Borchers      | Apr. 15, 1997  |
| 5,873,594     | Mc Coy et al. | Feb. 23, 1999  |
| 6,139,042     | Tetrick       | Oct. 31, 2000  |
| 6,173,984     | Kay           | Jan. 16, 2001  |
| 6,578,864     | Mc Coy et al. | Jun. 17, 2003  |

U.S. Pat. No. 5,149,122 of Helber is for an adjustable hitch assembly with a receiver unit that is slideably engaged with connector arms. The connector arms are slideably engaged with a vertical attachment post by means of a coupler, thus enabling the hitch to be adjusted in three dimensions. Readjustment is accomplished with fasteners that attach the assembly together. Preformed hole patterns in flanges and the arms of the connector accommodate standard hole patterns in the vehicle frame rails, thereby fitting most commercially available vehicles.

Borchers in U.S. Pat. No. 6,620,198 teaches a protective collar for installation on a receiver box, and a trailer hitch receiver for a vehicle. The trailer hitch receiver has a central frame member and vehicle mounting brackets. A receiver box is mounted to the frame member and includes a cavity adapted to receive a hitch bar.

U.S. Pat. No. 5,873,594 issued to Mc Coy et al. is for a hitch bar for a trailer hitch assembly formed from an elongated bar with a notched proximal end and a mounting rack carried on the distal end. The notch reduces the stiffness of the elongated bar, thereby allowing the bar to deflect and absorb a portion of the reaction load and to redistribute the load in a hitch box.

Tetrick in U.S. Pat. No. 6,139,042 discloses a carrier frame for a spring cushion truck hitch. The frame includes side mounting brackets and a transverse load-resisting bar that is connected between the mounting brackets. The carrier frame may be removed from the hitch and the hitch re-used in a different truck.

Kay in U.S. Pat. No. 6,173,984 teaches a hitch having a frame with a transversely-extending tubular structural member forming a dual tow bar receiver with mating dual towbar inserts.

U.S. Pat. No. 6,578,864 issued to Mc Coy et al. is for a trailer hitch receiver which consists of a main frame member, a hitch receiver box carried on the main frame member, and a pair of opposed mounting brackets. Each of the brackets contains a series of apertures for securing the mounting brackets to the main frame in two separate positions that share a set common of holes. The mounting brackets may be mounted in an inboard or outboard-position for a particular application.

DISCLOSURE OF THE INVENTION

Conventional hitch assemblies have been developed that permit aftermarket attachment of trailer tow hitches for use with pick-up trucks or other similar vehicles. This development is the result original equipment manufactures seldom providing the provisions for towing trailers. Therefore, many products have been developed to fill the need of such a hitch assembly, particularly in the more common class III application. As there is no industry standard relative to the mounting provisions in vehicle frame rails and trailer-towing tongue height, considerable development has been accomplished to fill this need. It is apparent that there is no device that has been developed that accomplishes all of the purposes relative to the position of vehicle components such as exhaust system, or spare tire mountings.

The present invention overcomes the problem of spacing between the vehicle rails by utilizing a telescoping design. A pair of hitch mounting arms telescope into a box hitch utilizing either a round tube or a square tube embodiment, thus becoming the primary object of the invention, combined with the means to also provide height adjustment in a robust and secure manner. The height adjustment is accomplished by providing a series of thru-holes arranged in a bolt circle pattern in a pair of otherwise conventional opposed frame mounting brackets. The hitch mounting arms include a round mounting plate having the same bolt pattern, thus permitting the mounting arms to be attached at completely different locations relative to their height and depth away from the rear of the vehicle.

An almost equally important object of the invention is that the receiver hitch assembly may be packaged in a relatively small container. While this object may not appear to be an important advantage, it has been found that many stores have limited space for display, particularly when a product is heavy and/or large. By separating the arms and box hitch into three pieces, the container may be considerably smaller. This will allow two assemblies to be displayed in the previous place of one. Many stores only restock the shelves during the night when the store is closed, therefore if a single item is sold during the day it is not replaced until the next day, which eliminates the potential for a second single sale per day. With the present invention this turnover may be doubled by the simple reduction in the packaging size.

Another object of the invention is the strength of the attachment between the arms and the frame mounting brackets. Prior art has attempted to provide adjustment by providing a series of holes in an evenly spaced array in the frame brackets and by using a pair of mating holes in the arm mounting flanges, either in common holes or in two diagonal holes for the depth adjustment. The present invention uses a plurality of thru-holes arranged in a bolt circle, which places the strength of the fasteners in the most ideal position relative to the forces created by the tongue weight and the shock and vibration of over the road transportation.

Yet another object of the invention is that the adjustment of the width is secured with a plurality of bolts and nuts that hold the arms that telescope into the box hitch securely. Additionally, at least two clinching bolts with locking nuts are located in threaded holes in the lower section of the box hitch sleeve. The clinching bolts, with their accompanying locking nuts, force the top of the arms to embrace the upper inner surface of the box hitch sleeve. The inclusion of this securement thereby eliminates any rattle or chatter between the elements when the invention is subjected to the shock and vibration that accompanies over the road transportation.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 13 is a partial isometric view of one of the hitch mounting arms in the round tubular steel body variations of the preferred embodiment.

FIG. 14 is a partial isometric view of one of the hitch mounting arms in the square tubular steel body variations of the preferred embodiment.

FIG. 15 is a cross-sectional view taken along lines 15—15 of FIG. 13.

FIG. 16 is a cross-sectional view taken along lines 16—16 of FIG. 14.

FIG. 17 is a cutaway top plan view of one of the hitch mounting arms in the preferred embodiment.

FIG. 18 is right end view of one of the hitch mounting arms in the preferred embodiment.

FIG. 19 is front view of one of the hitch mounting arms in the preferred embodiment.

FIG. 20 is side view of an optional wedged shaped adapter plate.

FIG. 21 is a cross-sectional view taken along lines 21—21 of FIG. 20.

BEST MODE FOR CARRYING OUT THE INVENTION

The best mode for carrying out the invention is presented in terms of a preferred embodiment for an adjustable receiver hitch 20 that is utilized to receive a trailer ball mount having a hitch ball mounted thereon. The hitch 20 is attached onto the frame of a motor vehicle used for pulling a trailer. The preferred embodiment of the adjustable receiver hitch 20, as shown in FIGS. 1 through 29, is comprised of a pair of opposed frame mounting brackets 22 that include flanges 24 formed on the upper surface that are configured for attachment onto the frame of the motor vehicle.

Figure 1:
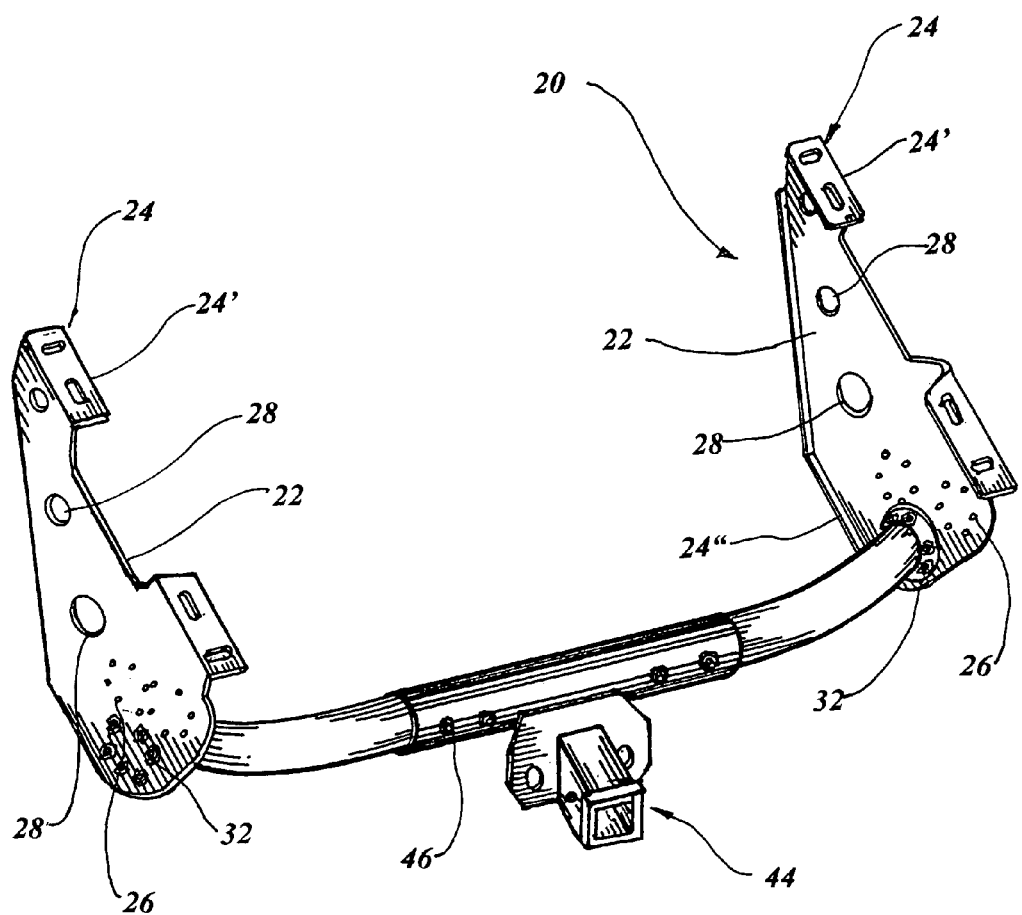
FIG. 1 is a partial isometric view of the adjustable receiver hitch in the preferred embodiment.
Figure 2:
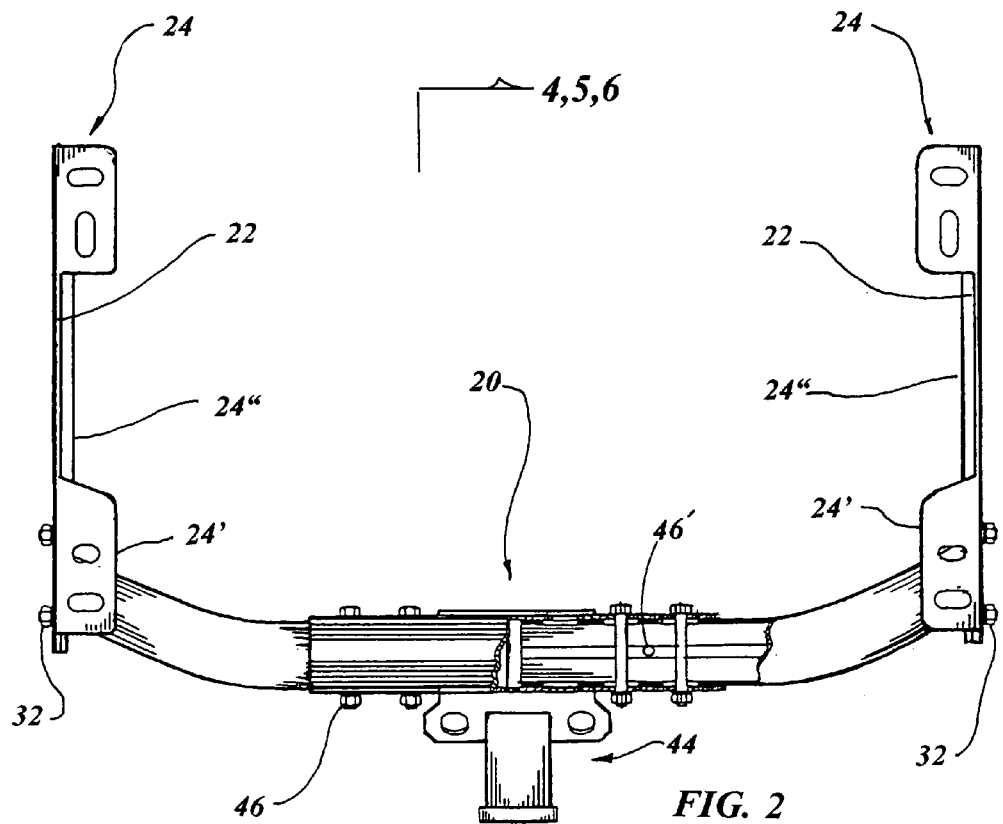
FIG. 2 is a plan view of the adjustable receiver hitch in the preferred embodiment.
Figure 3:
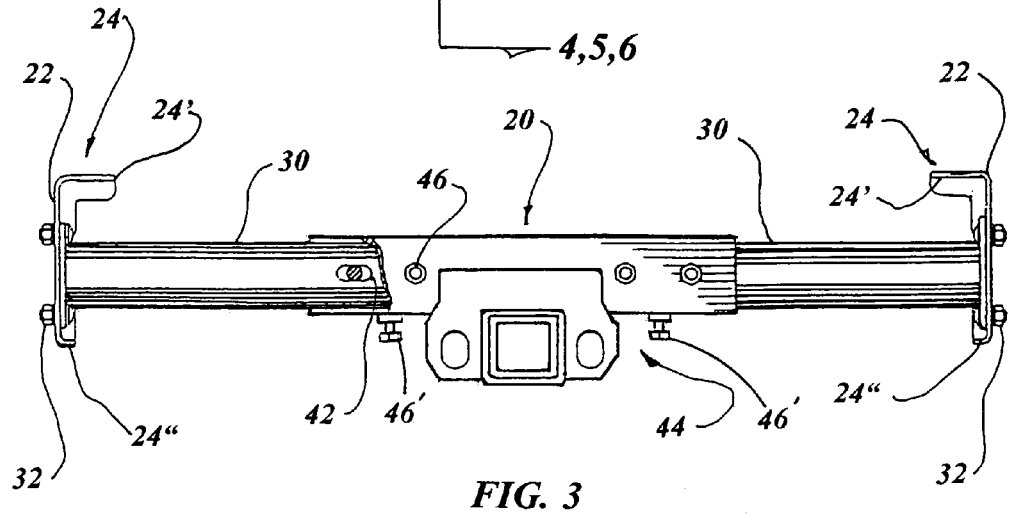
FIG. 3 is a front view of the adjustable receiver hitch in the preferred embodiment.
Figure 4:
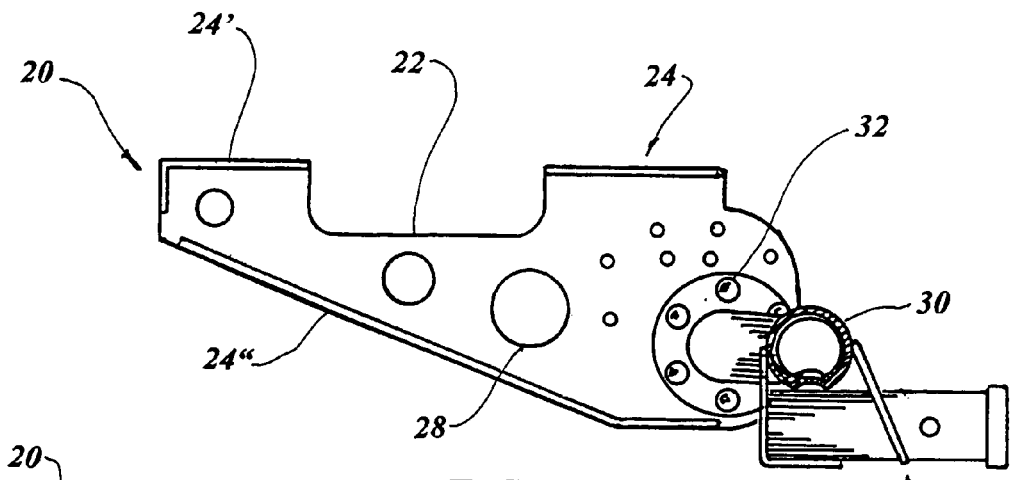
FIG. 4 is a cross-sectional view taken along lines 4—4 of FIG. 2.
Figure 5:
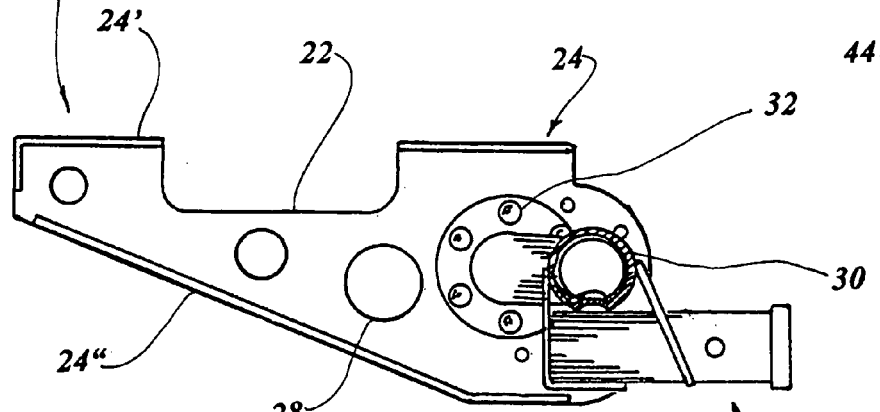
FIG. 5 is a cross-sectional view taken along lines 5—5 of FIG. 2.
Figure 6:
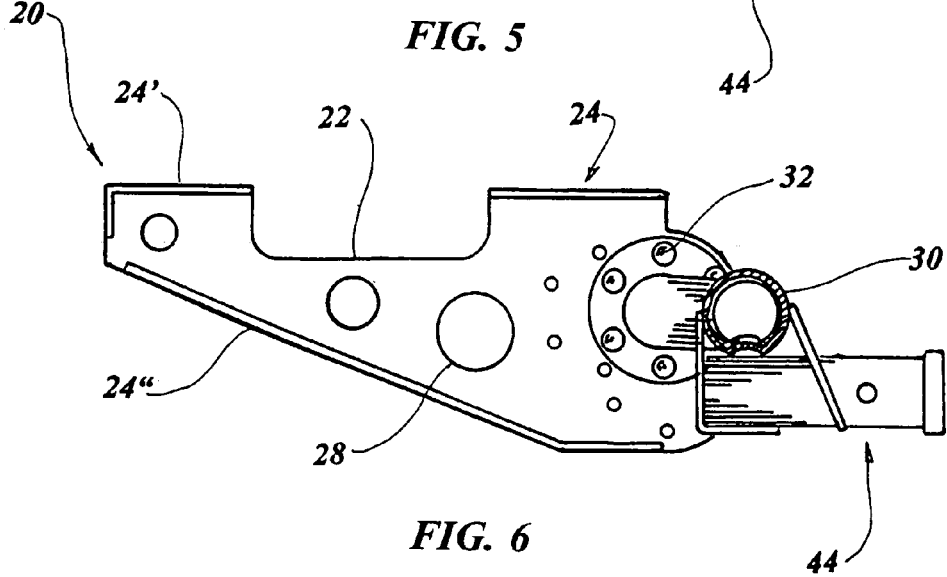
FIG. 6 is a cross-sectional view taken along lines 6—6 of FIG. 2.
Figure 7:
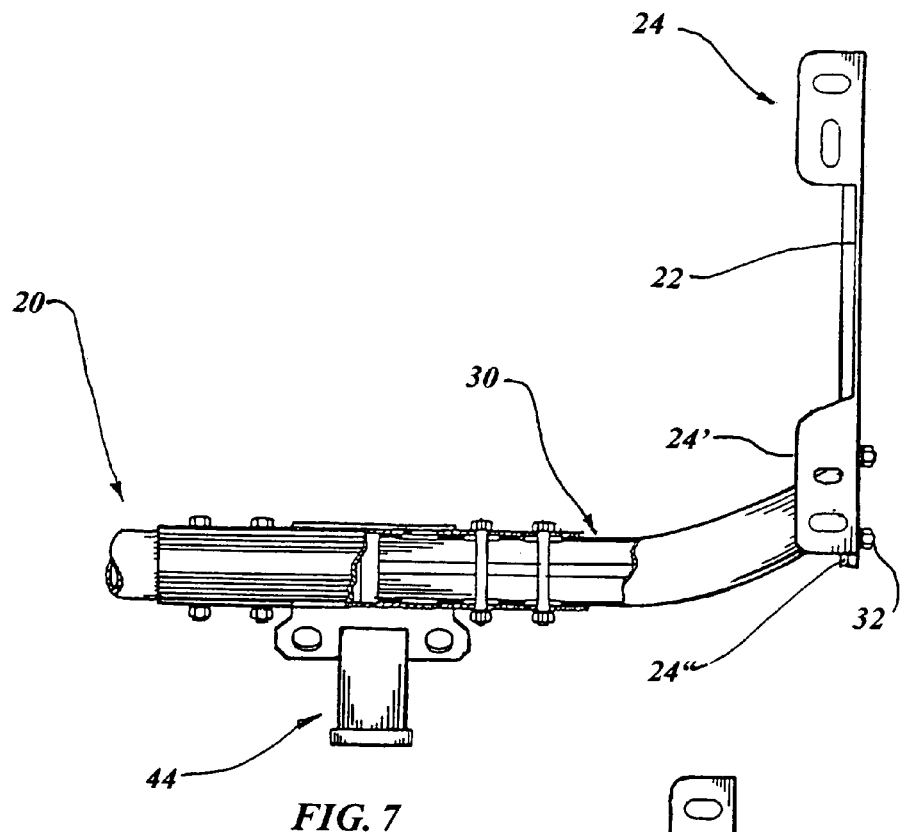
FIG. 7 is a partial plan view of the adjustable receiver hitch with the hitch mounting arm attached in the minimum width position.
Figure 8:
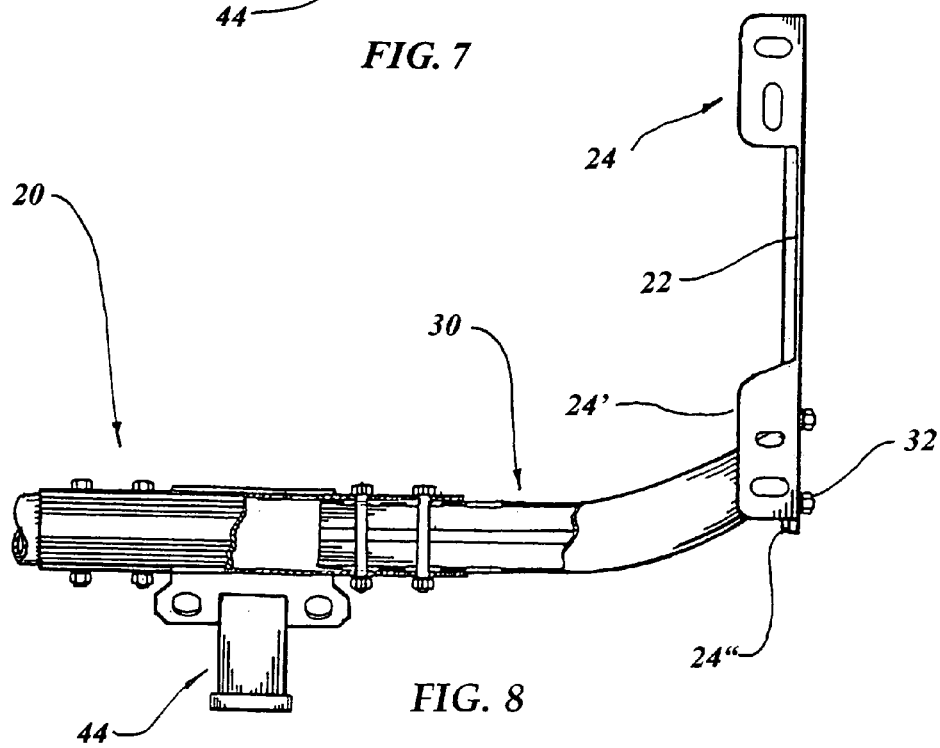
FIG. 8 is a partial plan view of the adjustable receiver hitch with the hitch mounting arm attached in the maximum width position.
Figure 9:
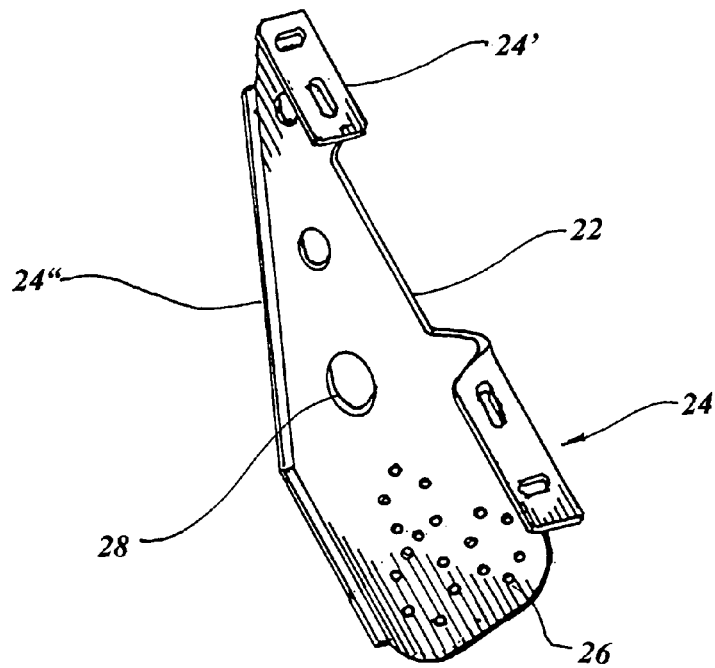
FIG. 9 is a partial isometric view of the frame mounting bracket in the preferred embodiment.
Figure 10:
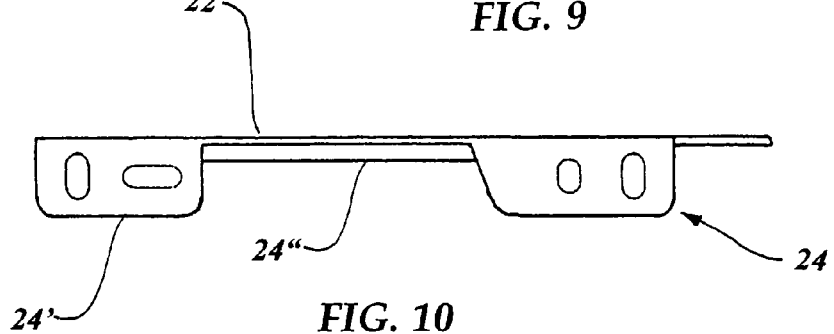
FIG. 10 is a top plan view of the frame mounting bracket in the preferred embodiment.
Figure 11:
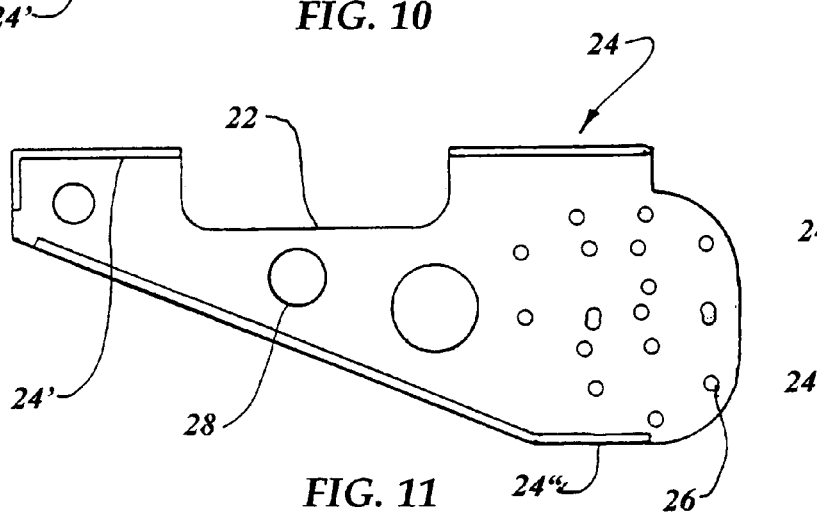
FIG. 11 is a left side view of the frame mounting bracket in the preferred embodiment.
Figure 12:
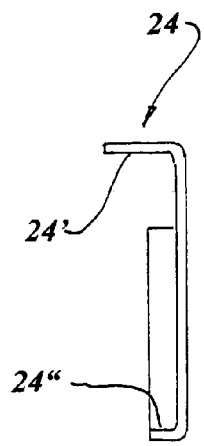
FIG. 12 is an end view of the frame mounting bracket in the preferred embodiment.

Each mounting bracket 22 has a plurality of bracket thru-holes 26 that are arranged in a bolt circle and are utilized for connecting the hitch 20 between the brackets 22, as shown in FIGS. 1–3. The flanges 24 on each opposed frame mounting bracket 22 consists of at least one, or preferably two, flanges 24' on the upper surface and a flange 24" on the lower surface, with the former for attaching to a frame of the motor vehicle and the latter for stiffening purposes. Further, the frame mounting bracket 22 preferably includes a plurality of lightening holes 28 that penetrate the flat areas of the bracket 22, as shown in FIGS. 1, 4–6, 9 and 11, to reduce weight. The bracket thru-holes 26 that are arranged in a bolt circle are placed in three separate patterns that do not share or overlap holes, as do some of the prior art for linear adjustment. The arrangement of thru-holes 29 permits the balance of the hitch 20 to be assembled in three different locations, as illustrated in FIGS. 4–6, which vary in both height and depth to provide a dual-expanded range of adjustments.

A pair of hitch mounting arms 30 are connected to each frame mounting bracket 22 with threaded fasteners 32. The fasteners 32 interface with a selected set of bolt circle arm thru-holes 34 for height adjustment of the receiver hitch 20 relative to the motor vehicle frame. The threaded fasteners 32 attaching the mounting arms 30 to the bracket 22 are preferably bolts and nuts, as illustrated in FIGS. 1–3 and 29.

The hitch mounting arms 30 consist optionally of either a round tubular steel body 36 having an indexing groove 36' formed therein, as shown in FIGS. 13 and 15–19, or a square tubular steel body 38, illustrated in FIGS. 14 and 16. In either case, a round mounting plate 40 is permanently attached to the body 38 or 40 on the first end, as shown. The round mounting plate 40 contains the plurality of arm thru-holes 34 that are arranged in a bolt circle and mate with the bracket thru-holes 26 in the brackets 22. The round tubular steel body 36 and the square tubular steel body 38 have a plurality of arm attaching slots 42 therethrough positioned adjacent to the second end of the body 36 or 38.

Figures 22, 23:
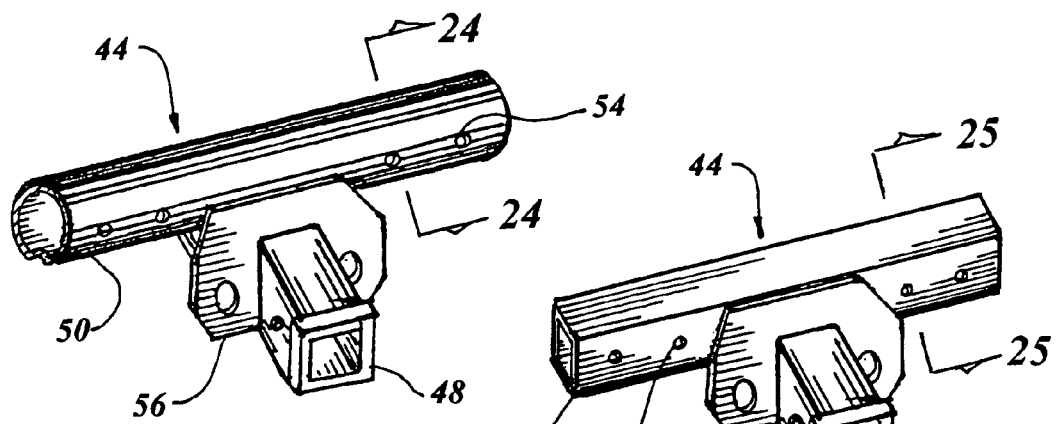
FIG. 22 is a partial isometric view of the box hitch in the round tubular steel body variations of the preferred embodiment.
FIG. 23 is a partial isometric view of the box hitch in the square tubular steel body variations of the preferred embodiment.
Figure 24:
FIG. 24 is a cross-sectional view taken along lines 24—24 of FIG. 22.
Figure 25:
FIG. 25 is a cross-sectional view taken along lines 25—25 of FIG. 23.

To complete the adjustable receiver hitch 20, the two hitch mounting arms 30 are adjustably inserted into a box hitch 44 on their second end and secured with mounting hardware 46. The box hitch 44 includes a receiver box 48 that is permanently connected, such as by a weld joint, under the box hitch 44 and is used for receiving a hitch ball mounted on a trailer ball mount (not shown as it is not part of the invention). The box hitch 44 consists of either a round tubular sleeve 50 having an indexing groove 50' formed therein, as shown in FIGS. 22, 24 and 26–28, or a square tubular sleeve 52, as shown in FIGS. 23 and 25. In either case a plurality of apertures 54 are positioned adjacent to each sleeve 50 or 52 distal end and a plurality of threaded holes 54' are located through the underside of the sleeve 50 or 52.

Figures 26, 27:
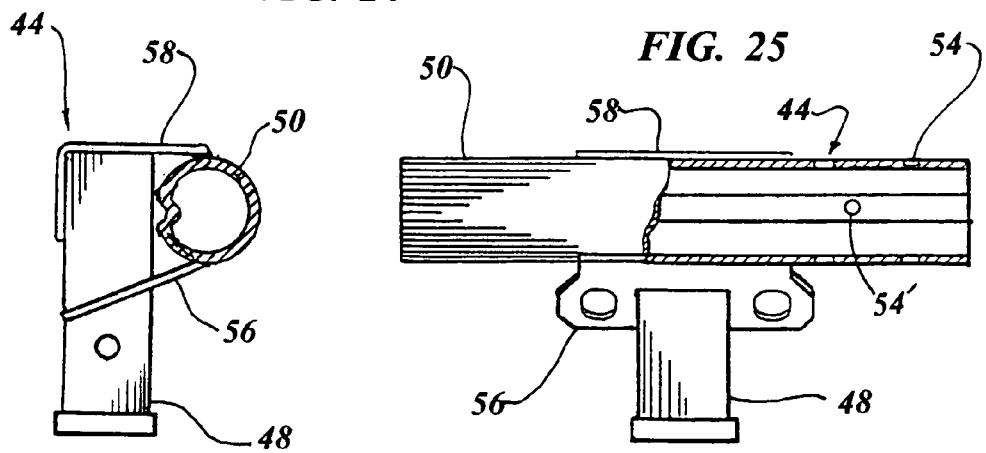
FIG. 26 is left side view of the box hitch in the preferred embodiment.
FIG. 27 is a cutaway top plan view of the box hitch in the preferred embodiment.
Figure 28:
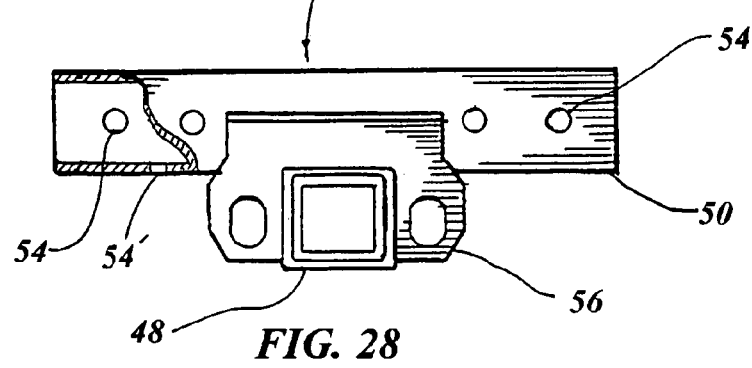
FIG. 28 is cutaway front view of the box hitch in the preferred embodiment.
Figure 29:
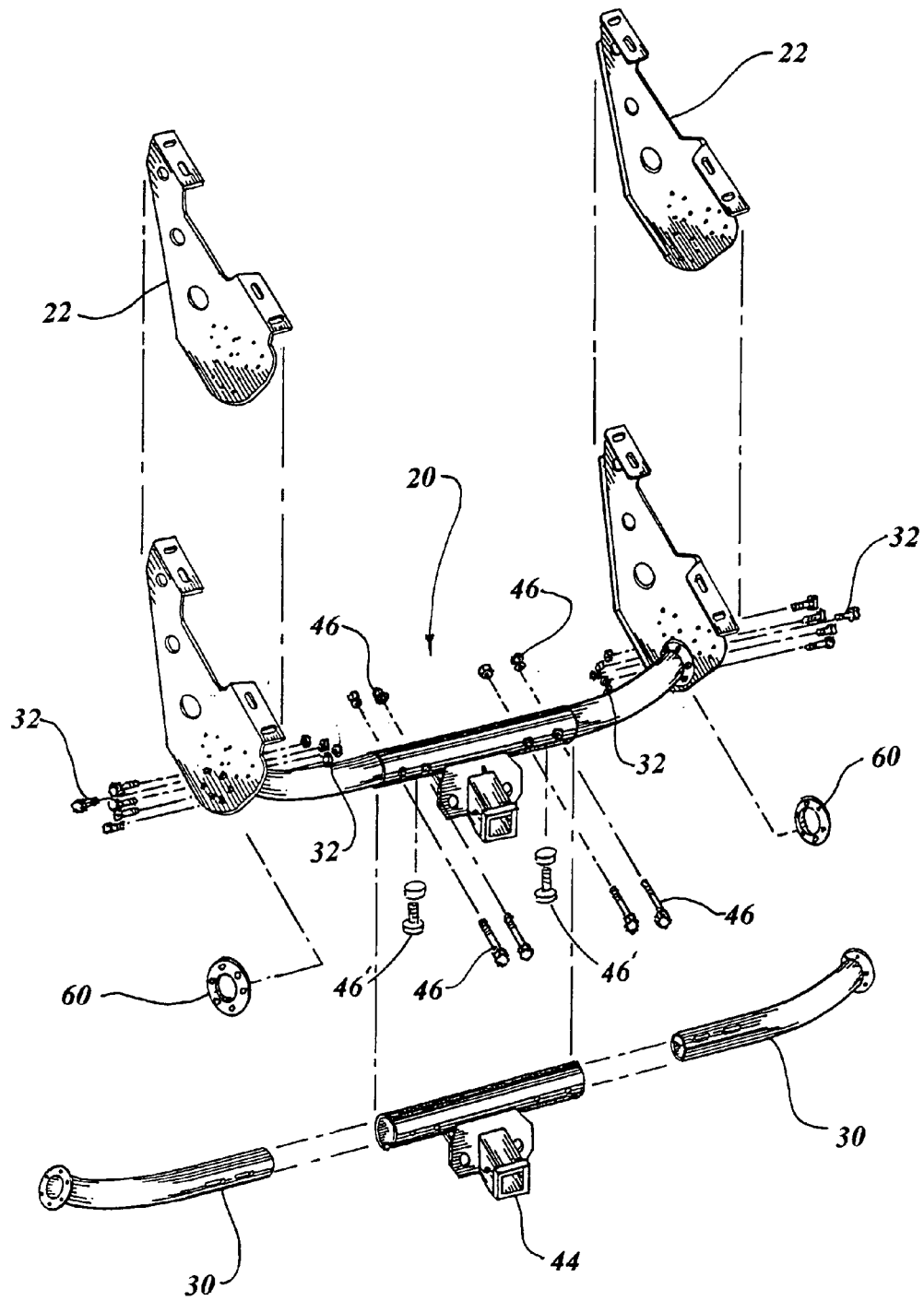
FIG. 29 is an exploded view of the adjustable receiver hitch.

The mounting hardware 46 for attaching the arms 30 to the box hitch's round or square tubular sleeve 50 or 52 consists of a plurality of bolts and nuts mated with a common selection of apertures 54, and the arm attaching slots 42 forming the receiver hitch width adjustment, as shown in FIGS. 2, 17 and 27. A plurality of clinching bolts with locking nuts 46' are attached to the threaded holes for securing the arms 30 in the box hitch sleeve 50 or 52.

A chain plate gusset 56 is permanently attached, between the box hitch's round or square tubular sleeve 50 or 52, onto the receiver box 48, which is a square tube in both cases. An angle stiffener 58 is also permanently attached onto the box hitch 44 and the round or square tubular sleeve 50 or 52 for structural reinforcement. The attachment and location of the chain plate gusset 56 and the angle stiffener 58 are illustrated best in FIGS. 22–28.

Since there are some pick-up trucks that have the main frame angled rather than parallel, a plurality of wedge-shaped adapter plates 60 are furnished with the adjustable receiver hitch 20, particularly when used on Ford trucks. The wedge shaped adapter plate 60 has a plurality of adapter thru-holes 62 that are arranged in a bolt circle corresponding to the bracket thru-holes 26 and the arm thru-holes 34, thus permitting the adjustable receiver hitch 20 to be mounted to a motor vehicle with an angularly tapered frame. While the invention has been described in detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

What is claimed is:

1. An adjustable receiver hitch for receiving a trailer ball mount with a hitch ball mounted thereon and that is attached onto the frame of a motor vehicle for pulling a trailer, wherein said adjustment receiver hitch comprises:
    a) a pair of opposed frame mounting brackets including flanges configured for attachment onto the frame of the motor vehicle, wherein each mounting bracket further having a plurality of bracket thru-holes arranged in a bolt circle for connection thereon,
    b) a pair of hitch mounting arms each having a first end and a second end, with the first end connected with threaded fasteners to each frame mounting bracket with the fasteners interfacing with a selected set of bolt circle arm thru-holes for height adjustment of the receiver hitch relative to the motor vehicle frame, and
    c) a box hitch adjustably attached onto the second end of each mounting arm in a telescoping manner with mounting hardware, said box hitch having a receiver box connected thereunder for receiving a hitch ball mounted on a trailer ball mount.

2. The adjustable receiver hitch as recited in claim 1 wherein each opposed frame mounting bracket further comprises at least one flange on the upper surface and at least one flange on the lower surface for attaching to a frame of the motor vehicle and for stiffening purposes, and wherein said frame mounting bracket having a plurality of lightening holes therethrough.

3. The adjustable receiver hitch as recited in claim 1 wherein said opposed frame mounting bracket thru-holes arranged in a bolt circle are defined as three separately bracket thru-holes.

4. The adjustable receiver hitch as recited in claim 1 wherein said threaded fasteners attaching said bracket flanges to said mounting arms are defined as bolts and nuts.

5. The adjustable receiver hitch as recited in claim 1 wherein each hitch mounting arm further comprises a round tubular steel body and a round mounting plate that are permanently attached to the first end, and wherein said round mounting plate having a plurality of arm thru-holes arranged in a bolt circle mating with the bracket thru holes.

6. The adjustable receiver hitch as recited in claim 5 wherein said round tubular steel body having an indexing groove formed therein.

7. The adjustable receiver hitch as recited in claim 5 wherein said round tubular steel body having a plurality of arm attaching slots therethrough that are positioned adjacent to said second end.

8. The adjustable receiver hitch as recited in claim 1 wherein said each hitch mounting arm further comprises a square tubular steel body and a round mounting plate that are permanently attached to the first end, and wherein said round mounting plate having a plurality of arm thru-holes arranged in a bolt circle mating with the bracket thru-holes.

9. The adjustable receiver hitch as recited in claim 8 wherein said square tubular steel body having a plurality of arm attaching slots therethrough positioned adjacent to said second end.

10. The adjustable receiver hitch as recited in claim 1 wherein said box hitch further comprises a round tubular sleeve having an indexing groove formed therein, a plurality of apertures adjacent to each distal end, and a plurality of threaded holes in a lower section of said sleeve.

11. The adjustable receiver hitch as recited in claim 10 wherein said mounting hardware for attaching said arms to said box hitch's round tubular sleeve further comprises a plurality of bolts and nuts mated with a common selection of apertures, with the arm attaching slots forming the receiver hitch width adjustment, and a plurality of clinching bolts with locking nuts attached to said threaded holes for securing the arms in the box hitch sleeve.

12. The adjustable receiver hitch as recited in claim 10 further comprising a chain plate gusset that is permanently attached between the box hitch's round tubular sleeve and the receiver box, and an angle stiffener attached onto the box hitch and the round tubular sleeve for structural reinforcement.

13. The adjustable receiver hitch as recited in claim 1 wherein said box hitch further comprises a square tubular sleeve having a plurality of apertures adjacent to each distal end, and a plurality of threaded holes in a lower section of said sleeve.

14. The adjustable receiver hitch as recited in claim 13 wherein said mounting hardware for attaching said arms to said box hitch's square tubular sleeve further comprises a plurality of bolts and nuts mated with a common selection of apertures, with the arm attaching slots forming the receiver hitch width adjustment, and a plurality of clinching bolts with locking nuts attached to said threaded holes for securing the arms in the box hitch sleeve.

15. The adjustable receiver hitch as recited in claim 13 further comprising a chain plate gusset that is permanently attached between the box hitch's square tubular sleeve and the receiver box, and an angle stiffener attached onto the box hitch and the round tubular sleeve for structural reinforcement.

16. The adjustable receiver hitch as recited in claim 1 further comprising a wedge-shaped adapter plate having a plurality of adapter thru-holes arranged in a bolt circle corresponding to said bracket thru-holes and said arm thru-holes, thereby permitting said adjustable receiver hitch to be mounted to a motor vehicle with a angularly tapered frame.

* * * * *